June 8, 1943.　　　W. C. PROTZ　　　2,321,512
METHOD AND APPARATUS FOR FORMING REINFORCED TAPE
Filed Sept. 6, 1940　　　2 Sheets-Sheet 1
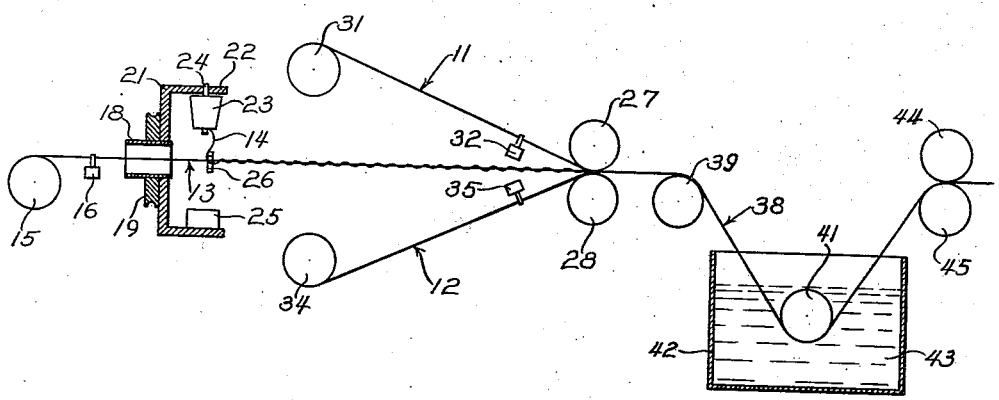
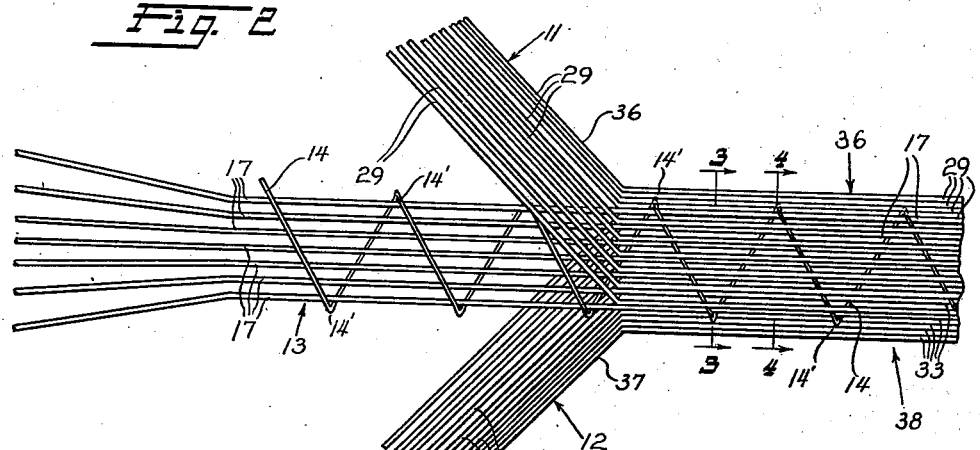
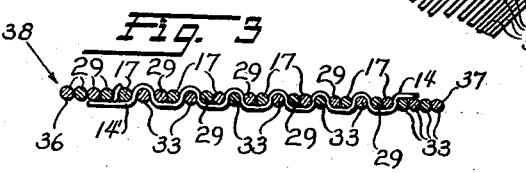
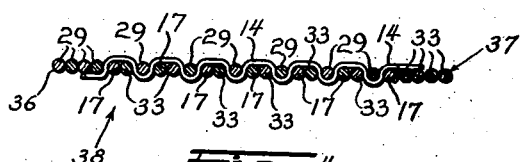
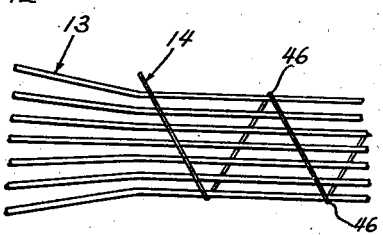
Inventor
William C. Protz
By Strauch & Hoffman
Attorneys June 8, 1943.   W. C. PROTZ   2,321,512
METHOD AND APPARATUS FOR FORMING REINFORCED TAPE
Filed Sept. 6, 1940   2 Sheets-Sheet 2
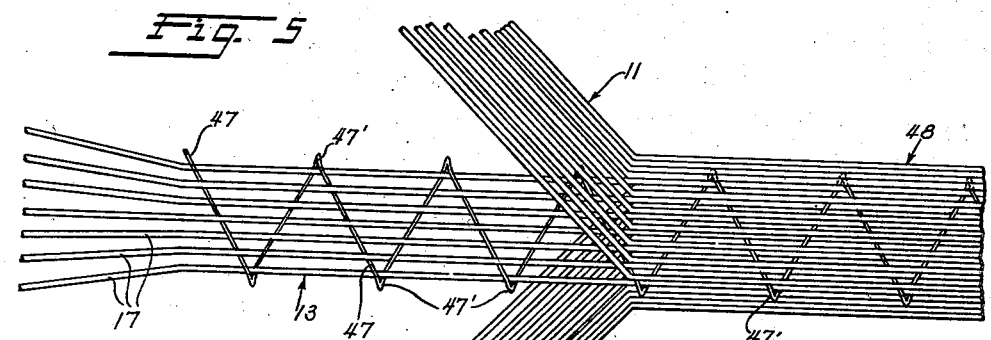
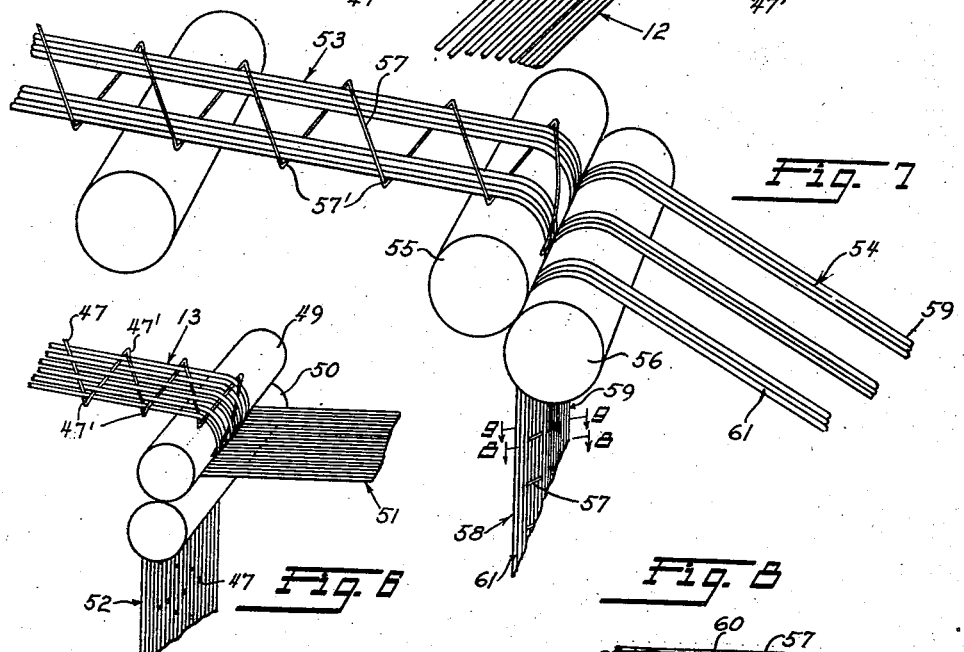
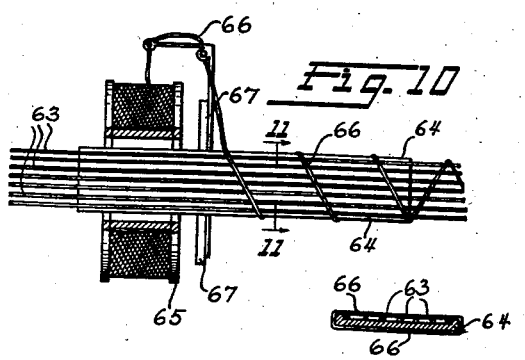
Inventor
William C. Protz
By
Strauch & Hoffman
Attorneys

Patented June 8, 1943

2,321,512

UNITED STATES PATENT OFFICE 2,321,512

METHOD AND APPARATUS FOR FORMING REINFORCED TAPE

William C. Protz, Manitowoc, Wis., assignor to National Tinsel Manufacturing Company, Manitowoc, Wis., a corporation of Wisconsin Application September 6, 1940, Serial No. 355,683

16 Claims. (Cl. 57—6)

This invention relates to tapes wherein a plurality of longitudinal or warp threads are adhesively secured together and more particularly to reinforced tapes of this character and methods of manufacturing them.

It has previously been known to manufacture single thread layer tapes of the so-called weftless type by arranging closely spaced longitudinal warp threads parallel to each other in two layers for alternate positioning of the threads of the two layers and pressing the layers together to provide a single layer flat tape while supplying adhesive to secure adjacent threads of the type together. This tape and the above described method of making it is disclosed in Bourdin Patent No. 1,195,554.

Such single layer weftless tapes are usually satisfactory when made in widths up to approximately three quarters of an inch, but wider tapes have an objectionable tendency to split longitudinally during use in tying packages and the like. The present invention is especially designed to reinforce wide tapes of this character against splitting, and to this end I incorporate in the tape a suitable cross or weft thread of sufficient strength to withstand the forces tending to split the tape. The invention may be also used for narrow tapes if desired or necessary for special purposes.

With the above in mind, it is a major object of the present invention to provide a novel reinforced tape and method of making it.

A further object of the invention is to provide a novel method of incorporating a reinforcing cross thread in a tape having a plurality of adhesively secured longitudinal threads.

A further object of the invention is to provide a novel method of making a reinforced tape comprising a plurality of adhesively secured warp threads wherein the warp threads are initially arranged in at least two groups or layers, the cross thread incorporated with one of the groups and the groups then pressed together to provide a flat substantially single thread thickness tape. Specifically the cross thread may be wound about its associated group, or woven or otherwise suitably incorporated therein.

A further object of the invention is to provide a novel binding tape comprising a plurality of adhesively secured longitudinal threads reinforced by a woven cross thread, and novel methods of making the same.

Other objects of the invention will presently appear as the description proceeds in connection with the appended claims and the annexed drawings in which:

Figure 1 is a diagrammatic side view illustrating a preferred embodiment of the method of the invention.

Figure 2 is an enlarged exaggerated diagrammatic plan view illustrating the manner in which the thread layers of Figure 1 are meshed.

Figure 2A is a fragmentary view illustrating a modified process wherein the cross thread is wound snugly upon its associated thread layer.

Figure 3 is a section along line 3—3 of Figure 2 illustrating the thread arrangements at one portion of the finished tape.

Figure 4 is a section along line 4—4 of Figure 2 illustrating the thread formation at another portion of the finished tape.

Figure 5 is a diagrammatic plan view similar to Figure 2 illustrating the incorporation of a woven cross thread in the tape of the invention.

Figure 6 illustrates a further embodiment of the method of the invention wherein only two layers of warp threads and a woven weft thread are employed.

Figure 7 illustrates a further embodiment of the invention wherein the warp threads of each layer are arranged in laterally spaced groups.

Figure 8 is a section along line 8—8 of Figure 7 illustrating the thread formation at one portion of the finished tape.

Figure 9 is a section along line 9—9 of Figure 7 illustrating the thread formation at another portion of the finished tape.

Figure 10 illustrates a further manner of winding a cross thread upon a layer of longitudinal threads which may be used in the methods of either Figure 1 or Figure 6.

Figure 11 is a section taken along line 11—11 of Figure 10.

In practising the method of the invention, I preferably provide at least two flat groups or layers of spaced parallel longitudinal or warp threads, and relatively position these layers so that the threads of each layer are located opposite spaces between threads of the other layers. It is not essential in my process that the individual threads of each layer be each located between adjacent threads of the other layer, and the threads of each layer may be arranged in laterally spaced groups disposed to fit between corresponding thread groups of the other layer as will appear.

I then incorporate a sinuous cross or weft thread with one of these layers and press the layers together so that their threads, or groups of threads are intercalated or interposed to provide a substantially single thread thickness tape. The weft thread may be incorporated with the selected layer by winding the weft substantially spirally about the layer, by weaving the weft into the layer or by any other suitable equivalent operation. Preferably the tape is then passed in succession through a suitable adhesive applying station, a tight roller pass which squeezes out excess adhesive, and then to a suitable drying station. It is within the scope of invention, however, to apply the adhesive to the thread layers at any period during the process as the particular time of application of adhesive is not an essential feature of the invention.

A preferred embodiment of the method of the invention and apparatus for accomplishing it is illustrated in Figure 1 wherein the tape is manufactured by combining upper, lower and intermediate longitudinal thread layers 11, 12 and 13, respectively, and a reinforcing weft thread 14.

In this method, weft thread 14 is incorporated with intermediate layer 13 before combination of layer 13 with layers 11 and 12. The threads of layer 13 are drawn from a suitable idle reel or bobbin station 15 and passed through a suitable horizontal comb device 16 from which they emerge as a flat horizortal layer of accurately spaced parallel threads. Individual threads 17 of layer 13 are preferably of cotton, which is inexpensive, but may be of any suitable material.

Emerging from comb 16, flat layer 13 passes axially through a hollow rotatable sleeve 18 supported on suitable bearings (not shown). Sleeve 18 carries a drive pulley 19 and a bobbin carrying frame 21. A bobbin 22 of large capacity but of any suitable construction carrying a cone of thread 23 is rotatably supported on frame 21 on a spindle 24 which is radial to sleeve 18. A suitable drive belt (not shown) rotates pulley 19 and frame 21 continuously. Sleeve 18 is of sufficiently large internal diameter to accommodate any width of tape to be made by the machine.

Diametrically opposite bobbin 22, frame 21 carries a counterweight 25 of substantially the same weight as a full bobbin 22 for balancing rotation of the frame.

Thread 14 extends downwardly to layer 13, and as frame 21 rotates, thread 14 is loosely laid or wrapped about layer 13 sinuously or substantially spirally. A suitable traveler ring or like guide indicated at 26 insures that this operation is carried out fairly uniformly as thread 14 is pulled from rotatable bobbin 22.

The pitch distance of spiral or sinuous winding 14 can be any desired amount. In a tape three quarters of an inch wide I have found it satisfactory to employ a pitch distance of about one quarter of an inch. This pitch distance may be regulated by controlling speed of rotation of the frame and is also dependent on the width of layer 13.

For practical purposes, however, I have found it unnecessary to employ any great accuracy in determining the pitch distance of wound thread 14 as it is essential only that thread 14 be laid or looped about and along moving layer 13.

I have discovered that in a tape of this character thread 14 may be a very fine light cotton or like thread much smaller than the warp threads. Such a fine thread does not objectionably separate the warp threads at the points it is clenched between them.

If desired, bobbin 22 may be positively rotated to unwind thread 14. By idly mounting spindle 24 on anti-friction bearings, however, the pull of wound moving layer 13 is sufficient to unwind thread 14 from its bobbin.

During the above described winding operation layer 13 is maintained under sufficient tension between comb 16 and a pass defined by a pair of driven pressure rollers 27 and 28 so that none of threads 17 are laterally displaced in the layer.

In winding weft 14 about layer 13, care is taken not to pull the winding so tightly as to laterally displace any of threads 17, and preferably the winding is sufficiently slack to provide loose loop portions 14' of substantial size along opposite edges of layer 13 as illustrated in Figure 2. The purpose of loop portions 14' will be described later.

Upper thread layer 11 comprises a plurality of threads 29 drawn from an idle bobbin or reel station 31 through a suitable spacer comb 32. Threads 29 are maintained under tension between rollers 27, 28 and comb 32. Similarly, lower thread layer 12 comprises a plurality of threads 33 drawn from an idle bobbin or reel station 34 through a suitable spacer comb 35. Threads 33 are maintained under tension between rollers 27, 28 and comb 35.

Layers 11, 12 and 13 may approach rollers 27, 28 at any suitable angle to the horizontal. In the illustrated embodiment, layer 13 travels in a substantially horizontal plane while layers 11 and 12 approach on opposite sides at equal angles. It is essential for purposes of the invention that the individual threads of the several layers be substantially parallel longitudinally and correctly spaced for intercalation in the desired manner as they enter the pass between rollers 27 and 28.

Combs 32 and 35 determine the thread spacing of layers 11 and 12 and accomplish such redirection of the threads as may be necessary to lay them parallel to layer 13. I have found it satisfactory to arrange the threads of the various layers to be intercalated as illustrated in Figures 3 and 4, but that specific arrangement is not essential. It is important only to insure that reasonable numbers of the threads of the several layers are intercalated or interposed so as to properly incorporate the weft thread into the final tape. The relative sizes and spacings of the threads have been purposely exaggerated in the drawings to clearly illustrate the invention, and the number of threads in each layer is a matter of choice.

Referring to Figure 2, several threads 29 are arranged substantially contiguously in a group or section indicated at 36 along an edge of layer 11. Similarly several threads 33 are arranged substantially contiguously in a group or section indicated at 37 along an edge layer 12. Combs 32 and 35 are suitably formed at opposite outer edges with very fine spacer sections corresponding to edge sections 36 and 37 and are designed to guide and direct layers 11 and 12 toward layer 13 in such manner that edge sections 36 and 37 are disposed just laterally outwardly of the opposite edges of layer 13 as the layers intercalate.

The threads entering the pass between rollers 27 and 38 are intercalated under pressure as illustrated in Figure 2 to form a flat single thread thickness tape 38. The thread spacing in the layers is such that in the final tape all adjacent threads are substantially contiguous except at points where they are slightly separated by weft 14.

As illustrated in Figures 3 and 4, pressure of rollers 27 and 28 causes loops 14' along one edge of layer 13 to be pressed flat against the bottom surface of edge section 36 and causes loops 14' along the other edge of layer 13 to be pressed flat against the top surface of edge section 37.

Emerging from rollers 27, 28 tape 38 passes over a guide roll 39 downwardly to a second guide roll 41 submerged in a container 42 partially filled with a suitable adhesive or glue composition 43. Tape 38, saturated with adhesive, is drawn upwardly from container 42 through a pressure pass consisting of a pair of driven rolls 44 and 45 which squeeze out excess adhesive and further flatten tape 38. The tape then passes to a suitable drier rack (not shown), and, after drying, is wound directly on suitable spools.

Figure 3 illustrates the thread arrangement of tape 38 at a portion where weft 14 is disposed under layer 13 after meshing with the other layers and Figure 4 illustrates the thread arrangements of tape 38 at a portion where weft 14 is disposed above layer 13 after intercalation of the layers. Weft 14 is therefore clinched between warp threads 17 and 33 at spaced portions of the tape and between warp threads 17 and 29 at alternately spaced portions of the tape. Moreover, loops 14' of the cross thread are adhesively bonded upon opposite sides of tape 38 thereby providing a positive interlock between the threads of all three layers. As illustrated in Figure 2, loops 14' terminate well inwardly of the lateral edges of tape 38 and are therefore protected against accidental pulling out during use. By this arrangement weft 14 helps secure the warp threads together as effectively as would a woven weft.

Tape 38 is inexpensive to manufacture and the weft thread is so effectively incorporated therein as to have no long objectionable outstanding loops which may snag or pull out. The tape is neat in appearance and the above described protection of the weft thread along the tape edges insures satisfactory performance. Employment of a very fine weft thread further reduces expense of manufacturing and insures a minimum of separation of the warp threads at any point in the tape.

Instead of providing a loose loop 14' at the edges of layer 13 I have found it satisfactory in some tapes to wind thread 14 about layer 13 with just sufficient slack to avoid setting up lateral stresses in the tape during meshing. This arrangement is illustrated in Figure 2A. It is not essential here that all of the lateral slack of the weft is taken up during pressure of the layers together, although such is desirable, and the most satisfactory degree of tension in weft 14 can easily be determined in practice and maintained.

In this embodiment, end loops 46 of cross thread 14 are even more effectively protected by edge sections 36 and 37 than loops 14'.

Further embodiments

Figure 5 is a diagrammatic plan view similar to Figure 2 but illustrating a further embodiment of the invention wherein the weft thread 47 is loosely incorporated with the intermediate warp layer 13 by a suitable weaving operation. For purposes of simplifying the present disclosure, no complicated weaving apparatus is illustrated in the drawings as substantially any ordinary ribbon or like weaving apparatus may be employed to weave weft 47 with threads 17.

Preferably cross thread 47 is woven sufficiently loosely to provide loops 47' of substantial size along opposite edges of layer 13, similarly to the formation of loops 14' of Figure 2, or the cross thread may be woven more tightly in the manner illustrated in Figure 2A.

A special weaving apparatus which is satisfactory for purposes of the invention is that disclosed in United States Patent No. 1,797,962, which embodies a large capacity weft thread bobbin useful for long runs. Other special looms satisfactory for purposes of the invention are disclosed in United States Patents Nos. 1,391,958 and 2,013,230.

After weaving of weft 47 into layer 13, the three layers 11, 12 and 13 are pressed together and adhesively secured as above described in connection with Figure 1 with alternate loops 47' extending over and being adhesively bonded upon opposite sides of the tape.

In the embodiment of Figure 6, layer 13 having the woven weft 47 incorporated therewith is meshed with a layer of warp threads 51 drawn from the opposite side of a roller pass consisting of driven rollers 49 and 50. The individual threads of each layer are imbedded or intercalated between the threads of the other layer in the resulting flat tape 52. All of the loops 47' overlie the same surface of the tape in this embodiment.

After leaving rollers 49, 50, tape 52 is drawn through the adhesive applying and squeezing stations illustrated in Figure 1, and dried.

In the embodiment illustrated in Figures 7-9, two layers of tensed warp threads 53 and 54 having their threads arranged in laterally spaced minor groups are drawn from opposite sides of a pressure pass consisting of driven rollers 55 and 56. The threads of the layers are longitudinally parallel and the groups of each layer are arranged opposite the spaces between the groups of the other layer.

A weft thread 57 is loosely laid about layer 53 before the layers are combined. Preferably the apparatus illustrated at frame 21 of Figure 1 is employed for this purpose, although alternatively weft 57 may be woven into the thread groups of layer 53 in the manner of Figures 5 and 6 above, but in any event edge loops 57' similar to loops 14' are formed.

At the roller pass, the opposed groups of layers 53 and 54 intercalate to form the single thickness layer tape 58. As shown in Figures 7 and 8, thread 57 lies in a long loop 60 along one side of the tape at spaced portions and is clenched between the adjacent thread groups at the other side of the tape at alternate spaced portions. Layer 54 is the wider and comprises edge groups 59 and 61. As the layers are intercalated alternate edge loops 57' are secured upon the same side of the tape, loops 57' along one edge of layer 53 overlying group 59 and loops 57' along the other edge of layer 53 overlying group 61.

This embodiment is satisfactory for some ornamental purposes because of the long exposed loop 60 illustrated in Figure 8, but this long loop is generally unsatisfactory where the tape is subjected to rough handling wherein the loop may catch on projections and be pulled out.

Figures 9 and 10 illustrate an optional method and apparatus for laying the weft thread about a layer of tensed warp threads. A layer of warp threads 63 is drawn under tension along a flat shallow rigid guide channel or tongue 64, which extends centrally through a rotatable spool 65 wound with light thread 66.

A rotatable flyer 67 guides thread 66 from spool 65 to tongue 64 and, as spool 65 is rotated by a suitable drive means (not shown) during advancement of layer 63 to the right in Figure 9, thread 66 is wound about tongue 64. The free end of thread 66 is suitably initially wound around layer 63 where the latter emerges from tongue 64. Advancement of the layer stretches the unwound thread on tongue 64 to a spiral as illustrated in Figure 9, and this spiral slips off the tongue end onto layer 63.

For further illustration of the scope of the invention, I may employ the cross thread winding methods and apparatus disclosed in Patents No. 939,839 or No. 1,990,849 for winding the weft thread along the desired layer.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a method of making a tape, the steps of providing a group of longitudinally parallel spaced threads in a substantially flat layer, incorporating with the spaced threads of said layer a cross thread lying in a sinuous path above and below said layer; providing a further group of spaced longitudinally parallel threads so relatively laterally arranged with respect to said first layer that certain of the threads of the respective groups are positioned for intercalation, and pressing said groups together into a flat tape.

2. In the method defined in claim 1, the step of incorporating said cross thread with the spaced threads of said layer which comprises laying said cross thread about and along said layer in a sinuous winding.

3. In the method defined in claim 1, the step of incorporating said cross thread in said layer which comprises weaving said cross thread into the threads of said layer.

4. In a method of making a tape, the steps of providing a plurality of longitudinally parallel spaced threads in a flat layer, incorporating with the spaced threads of said layer a cross thread lying in a sinuous path above and below said layer, providing a further plurality of longitudinally parallel spaced threads in at least one other flat layer wherein the threads are so relatively laterally arranged with respect to said first layer that certain of the threads of the respective layers are positioned for intercalation, pressing the layers together to form a flat tape wherein the cross thread is anchored, and adhesively securing the threads together.

5. In a method of making a tape, the steps of providing a plurality of longitudinally parallel spaced threads under tension in a flat layer, laying a cross thread about and along said layer in a substantially flat spiral winding, providing a further plurality of longitudinally parallel spaced threads in at least one other flat layer wherein the threads are so relatively laterally arranged with respect to said first layer that certain of the threads of the respective layers are positioned for intercalation, pressing the layers together to form a flat tape wherein the cross thread is anchored, and adhesively securing the threads together.

6. In a method of making a tape, the steps of providing a plurality of longitudinally parallel spaced threads arranged in a flat layer, weaving a cross thread into said layer to lie in a sinuous path along said layer, providing a further plurality of longitudinally parallel spaced threads in at least one other flat layer wherein the threads are so relatively laterally arranged with respect to said first layer that certain of the threads of the respective layers are positioned for intercalation, pressing the layers together to form a flat tape wherein the cross thread is anchored, and adhesively securing the threads together.

7. In a method of making a tape, the steps of providing a plurality of longitudinally parallel spaced threads in a flat layer, incorporating with the spaced threads of said layer a cross thread lying in a sinuous path along said layer, providing a further plurality of longitudinally parallel spaced threads in separate layers at opposite sides of said first layer with the threads of the respective layers substantially parallel longitudinally and so relatively laterally positioned with respect to said first layer that certain of the threads of the respective layers are positioned for intercalation, and pressing all three layers together to form a flat tape wherein the cross thread is anchored.

8. In the method defined in claim 7, the steps of incorporating said cross thread into said first layer by winding the cross thread in a substantially flat spiral along said layer.

9. In the method defined in claim 7, the steps of incorporating said cross thread into said first layer by weaving.

10. In a method of making a flat tape wherein at least two groups of threads each comprising a plurality of longitudinally parallel-spaced threads arranged in a flat layer are pressed together to intercalate the threads of the respective groups, the step of winding a cross thread in a loose substantially spiral winding about and along one of said groups prior to said intercalation.

11. In a method of making a flat tape wherein at least two group of threads each comprising a plurality of longitudinally parallel spaced threads arranged in a flat layer are pressed together to intercalate the threads of the respective groups, the step of loosely weaving a cross thread into the threads of one of said layers prior to said intercalation.

12. In a method of making a tape, the steps of providing a group of longitudinally parallel spaced threads in a substantially flat layer, incorporating with said layer a cross thread which extends to and fro between opposite edges of said layer in a sinuous path along said layer, providing a further group of at least one layer of spaced longitudinally parallel threads so relatively laterally arranged with respect to said first group that certain of the threads of the respective groups are positioned for intercalation while certain closely adjacent longitudinal threads along opposite edges of said second group are positioned laterally outwardly of said first group, and pressing said groups together to form a flat tape wherein said certain adjacent threads provide protective edge sections along said tape.

13. In a method of making a tape, the steps of providing a plurality of longitudinally parallel spaced threads in a flat layer, incorporating with said layer a cross thread which extends to and fro between opposite edges of said layer in a sinuous path along said layer, providing a further plurality of longitudinally parallel spaced threads in separate layers at opposite sides of said first layer with the threads of the several layers substantially parallel longitudinally and so relatively laterally arranged with respect to each other and said first group that certain of the threads of all three layers are positioned for intercalation and certain adjacent threads along an edge of each of said two further layers are positioned laterally beyond said first layer, and pressing said layers together into a unitary tape wherein said certain adjacent threads provide protective edge sections along said tape.

14. In a method of making a tape, the steps of providing a plurality of longitudinally parallel spaced threads in a flat layer, incorporating with said layer a cross thread lying in a sinuous path along said layer and having loose loops of substantial size outstanding from opposite edges of said layer, providing a further pluarlity of longitudinally parallel spaced threads in at least one other flat layer wherein the threads are so laterally arranged with respect to the threads of the first layer that certain of the threads of the respective layers are positioned for intercalation, and pressing and adhesively securing the layers together to form a flat tape wherein the cross thread is anchored and said loops are bonded in overlying surface engagement with said tape.

15. In a method of making a tape, the steps of providing a plurality of longitudinally parallel spaced threads in a flat layer, incorporating into said layer a cross thread lying in a sinuous path along said layer and having loose loops of substantial size outstanding from opposite edges of said layer, providing a further plurality of longitudinally parallel spaced threads in separate layers at opposite sides of said first layer with the threads of the respective layers substantially parallel longitudinally and so relatively laterally positioned that certain of them are positioned for intercalation, and pressing and adhesively securing together said layers to form a flat tape wherein the cross thread is anchored with alternate loops bonded in overlying engagement with opposite surfaces of said tape.

16. Tape manufacturing apparatus comprising guide means providing a flat layer of longitudinally parallel spaced threads, means drawing said layer along a selected path with the individual threads under tension, means incorporating an encircling cross thread with said spaced threads, said cross thread being disposed in a sinuous path along said layer, guide means providing at least one further flat layer of longitudinally parallel spaced threads with the threads of the respective layers longitudinally parallel and arranging the threads of said layers for intercalation with each other, and means pressing said layers together to intercalate the threads thereof to form a flat tape wherein the cross thread is anchored.

WILLIAM C. PROTZ.